US006628207B1

United States Patent
Hemminger et al.

(12) United States Patent
(10) Patent No.: US 6,628,207 B1
(45) Date of Patent: Sep. 30, 2003

(54) METHOD AND APPARATUS FOR DETECTING AND REPORTING A POWER OUTAGE

(75) Inventors: Rodney C. Hemminger, Raleigh, NC (US); Albert H. Maxwell, Jr., Raleigh, NC (US); Thomas J. Van Heuklon, Kaukauna, WI (US); Richard L. Tenor, Green Bay, WI (US); Scott Weikel, Raleigh, NC (US); Michael Murphy, Raleigh, NC (US); Todd Kelsey, Appleton, WI (US)

(73) Assignee: Elster Electricity, LLC, Horsham, PA (US)

( * ) Notice: Subject to any disclaimer, the term of this patent is extended or adjusted under 35 U.S.C. 154(b) by 0 days.

(21) Appl. No.: 09/508,219
(22) PCT Filed: Dec. 21, 1998
(86) PCT No.: PCT/US98/27157
§ 371 (c)(1),
(2), (4) Date: May 23, 2000
(87) PCT Pub. No.: WO99/34342
PCT Pub. Date: Jul. 8, 1999

Related U.S. Application Data
(60) Provisional application No. 60/068,832, filed on Dec. 24, 1997.

(51) Int. Cl.[7] ............................................. G08C 15/06
(52) U.S. Cl. ............. 340/870.02; 324/110; 379/106.01
(58) Field of Search ................ 340/870.02; 379/106.01, 379/106.03; 324/110

(56) References Cited

U.S. PATENT DOCUMENTS

| | | | |
|---|---|---|---|
| 5,434,911 A | 7/1995 | Gray et al. ................... | 379/106 |
| 5,488,565 A | 1/1996 | Kennon et al. | |
| 5,572,438 A | 11/1996 | Ehlers et al. ................ | 364/492 |
| 5,590,179 A | 12/1996 | Shincovich et al. ......... | 379/107 |
| 5,648,888 A | 7/1997 | LeFrancois et al. ......... | 361/603 |
| 5,699,276 A | 12/1997 | Roos | |
| 5,737,400 A | 4/1998 | Bagchi et al. ............... | 375/142 |
| 5,767,790 A * | 6/1998 | Jovellann ............... | 340/870.02 |
| 5,982,862 A * | 11/1999 | Bradley et al. ......... | 379/106.06 |
| 5,994,892 A * | 11/1999 | Turino et al. ........... | 340/870.02 |
| 6,232,886 B1 * | 5/2001 | Morand ................... | 340/870.02 |
| 6,470,083 B1 * | 10/2002 | Hemminger et al. ... | 379/106.08 |

OTHER PUBLICATIONS

U.S. patent application Ser. No. 08/998,166, Tenor et al., filed Dec. 24, 1997.

* cited by examiner

Primary Examiner—Timothy Edwards
(74) Attorney, Agent, or Firm—Woodcock Washburn LLP

(57) ABSTRACT

A method and apparatus for detecting a power outage within an energy meter and alerting a remote central computer about the outage using call-in reporting via modem (35) within the meter to a telephone number designated for outage reporting. A primary battery cell or pack (55) is placed inside the meter (40) to operate the modem (35) when line power is lost. The modem (35) switches from a line power source in the meter (40) to the battery source (55) when an outage is detected and is to be reported to the remote central computer as an outage call. The battery source (55) is switched off when the outage is completed or aborted. The number of retries to call to report the power outage and the time period between retries is programmable.

16 Claims, 7 Drawing Sheets

| FIG.4 | |
|---|---|
| FIG.4A | FIG.4B |
| FIG.4C | FIG.4D |

METHOD AND APPARATUS FOR DETECTING AND REPORTING A POWER OUTAGE

This application claims the benefit of U.S. Provisional Application No. 60/068,832, filed Dec. 24, 1997.

FIELD OF THE INVENTION

The present invention relates in general to the field of utility meters. More particularly, the present invention relates to automatic equipment and systems used for remote reading of utility meters, such as electric, gas, or water meters, via telephone lines and modems. Even more particularly, the present invention relates to a method and apparatus for detecting a power outage to a meter and its modem, and reporting the outage to a central office.

BACKGROUND OF THE INVENTION

The recent deregulation of the utility industry has created a market for products that facilitate the efficient distribution and monitoring of electrical power. In the past, utilities have built systems that worked in a coordinated but independent fashion, and did not provide easy access to certain information necessary to adequately monitor and control a substation, or multiple substations, and related feeder networks and the like from a central location. (Electrical distribution substations and the equipment used therein, such as transformers, circuit breakers, disconnect switches, etc., are well known. See, e.g., U.S. Pat. No. 5,648,888, Jul. 15, 1997, titled "Power Distribution Substation," for background information regarding such substations.) For example, separate devices have been used to monitor a power system to determine when an event, such as loss of power, reduction in supplied voltage, distortion of the voltage or current waveform, or the like, has occurred on the system. One reason to monitor power outage is economic, e.g., power outage will affect equipment and processes and can result in misoperation and damage of equipment, disruption of operations, and other such anomalies. Moreover, with deregulation, many different companies provide power. A consumer, such as a business, may now be able to choose its utility provider, and therefore the customer may now have a need or desire to determine the reliability of the power supplied by its present supplier. Similarly, the utilities have a need to monitor the power they supply to customers to ensure that they are reliably providing power to retain their customers. The sooner a company knows about an outage, the sooner it can be fixed. This provides a competitive advantage. Furthermore, the utilities have a need to localize a fault location in order to determine at what point on a line the power outage has occurred. Therefore, utilities and consumers are now in need of systems to coordinate functionality, such as power quality monitoring, through a network. One aspect of the present invention concerns a system for enabling a utility or one of its customers (such as a large consumer of power) to detect and be notified of a power outage.

Although the art of meter reading via modems and telephone lines is well developed, there remain some problems inherent in this technology, particularly with respect to detecting and reporting a power outage. Therefore, a need exists for a method and apparatus for detecting and reporting a power outage that overcomes the drawbacks of the prior art.

SUMMARY OF THE INVENTION

The present invention is directed to an energy meter comprising: a modem having a modem power supply and a modem microcontroller; a power supply for the energy meter coupled to the modem power supply; a battery coupled to the modem power supply; and a telecommunications interface coupled to the modem.

According to one aspect of the present invention, the modem microcontroller monitors the status of the power supply to the energy meter.

In accordance with an aspect of the present invention, the modem microcontroller switches the modem power supply to the battery when the power supply for the energy meter is out.

In accordance with a further aspect of the present invention, the modem microcontroller places an outage reporting call via the telecommunications interface when the power supply for the energy meter is out. The outage reporting call reports outage data comprising an identification, a date, and a time when the power supply for the energy meter is out.

In accordance with a further aspect of the present invention, the meter further comprises off-hook and intrusion detection means for determining the state of a telephone line prior to and during calls.

In accordance with a further aspect of the present invention, the meter further comprises a timer for timing a duration of a power outage.

In a further embodiment within the scope of the present invention, an apparatus is provided for reporting a power outage at an energy meter to a remote site. The apparatus comprises: a modem having a modem power supply and a modem microcontroller; a battery coupled to the modem power supply; and a telecommunications interface coupled to the modem.

Another embodiment within the scope of this invention includes a method of transmitting data from an energy meter indicative of a power outage, comprising the steps of: detecting the power outage; powering a modem by a battery; storing outage data; and placing an outage reporting call to a remote site.

According to another aspect of the present invention, the method further comprises the steps of: determining if the outage reporting call was successful; turning off the modem if the outage reporting call was successful; and placing another outage reporting call to the remote site if the outage reporting call was not successful.

According to another aspect of the present invention, the step of placing another outage reporting call is performed if the outage reporting call was not successful and if a number of attempted outage reporting calls does not exceed a predetermined number.

According to another aspect of the present invention, if the number of attempted outage reporting calls exceeds the predetermined number, the modem is turned off and/or disconnected from the battery.

According to another aspect of the present invention, the method further comprises the steps of determining if the power outage is still occurring prior to placing the outage reporting call; determining if the power outage is still occurring after placing the outage reporting call; and turning off the modem if the power outage has ended prior to or after placing the outage reporting call.

According to another aspect of the present invention, the method further comprises the step of waiting a predetermined time before placing the outage reporting call.

The foregoing and other aspects of the present invention will become apparent from the following detailed descrip-

DESCRIPTION OF EXEMPLARY EMBODIMENTS AND BEST MODE

The present invention is directed to a method and apparatus for detecting a power outage within an energy meter and alerting a remote central computer about the outage using call-in reporting via a telephone line modem within the meter to a telephone number designated for outage reporting. A primary battery cell or pack is placed inside the meter to operate the modem when line power is lost. The modem switches from a line power source in the meter to the battery source when an outage is detected and is to be reported to the remote central computer. The battery source is switched off when the outage call is completed or aborted.

The meter reports a power outage via a battery powered modem on the meter. The modem optionally further comprises an additional microprocessor to implement smart processes such as outage reporting protocol and a sleep or power saving mode to save power. The number of retries to call to report the power outage and the time period between retries is programmable.

Figure 1:
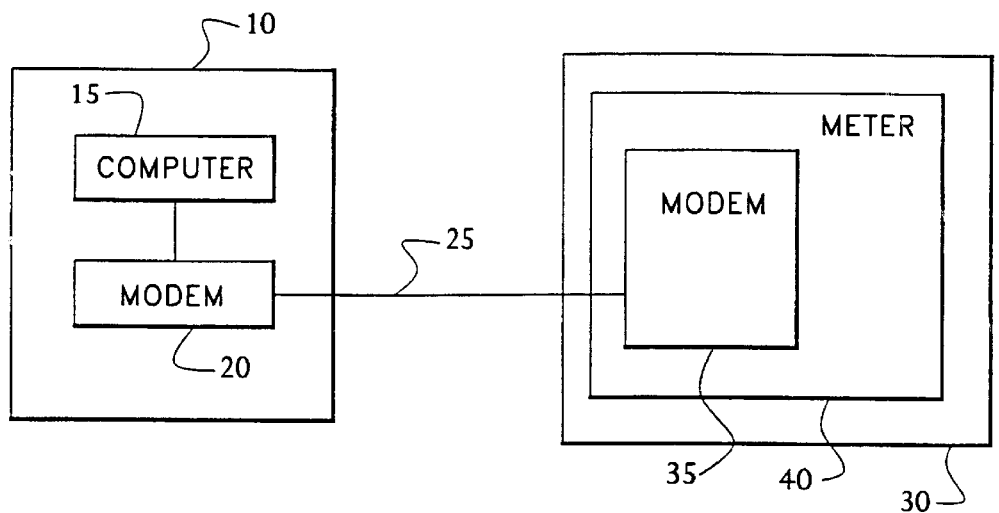
FIG. 1 is a block diagram of an automatic metering system incorporating a meter unit in accordance with the present invention.

FIG. 1 shows a block diagram of an automatic metering system incorporating a meter unit in accordance with the present invention. A utility company 10 has a computer 15 coupled to a modem 20 in a central office. The modem 20 is coupled to a modem 35 located at a utility customer's site 30, which may be, for example, a business, residential or manufacturing establishment, via a telephone line 25. The modem 35 is coupled to a utility meter 40 which measures the consumption of a utility by utility-consuming equipment (not shown). The modem 35 is located internal to the meter 40. Data relating to the consumption of the utility is stored in a memory (not shown), such as an EEPROM (electrically erasable programmable read-only memory) or a RAM (random access memory) which can have a battery back-up, residing within the meter 40. The data is communicated between the memory and the central office of the utility company 10 on the telephone line 25 using the modems 20 and 35. The modem 35 can also be coupled to a computer at a customer's site to alert the customer to a power outage or provide usage data.

The meter 40 can be any conventional electronic utility measuring meter, such as the Alpha Power+® Meter manufactured by ABB Power T&D Company, Inc., Raleigh, N.C. The modem 35 is a conventional modem except that it includes the additional hardware and software, such as a battery and a microprocessor, in accordance with the present invention, as described below with respect to FIG. 2.

Modem support can be provided on the circuit board of the meter. A modem board is used as a telecommunications interface to report data and alarms such as a line power outage. The meter 40 can be programmed to call back to a specified phone number for a billing read and to a second number when a power outage occurs.

Figure 2:
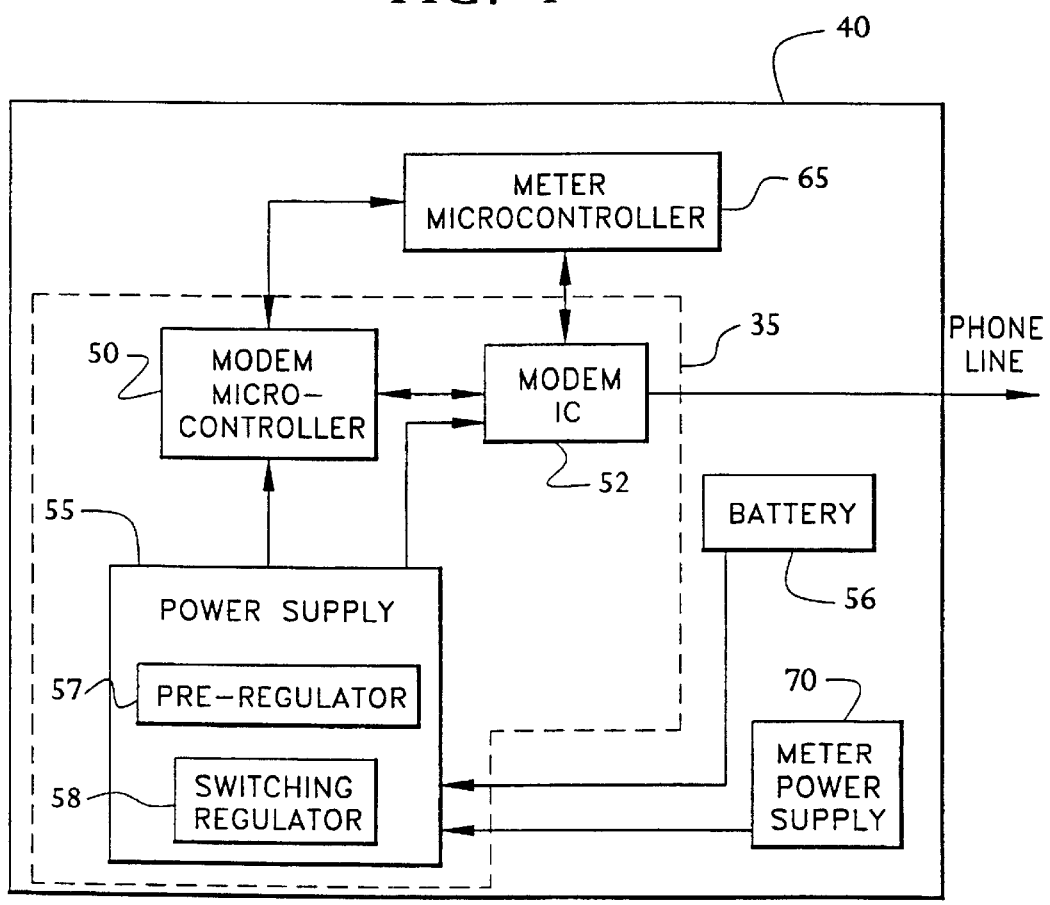
FIG. 2 is a block diagram of an exemplary modem in accordance with the present invention.

An exemplary block diagram of the meter 40 comprising the modem 35 of FIG. 1 in accordance with the present invention is shown in FIG. 2. The modem 35 comprises a microcontroller 50, a modem integrated circuit (IC) 52, and a power supply 55. The power supply 55 can be a conventional modem power supply comprising, for example, a linear pre-regulator 57 and/or a switching regulator 58, both of with which those skilled in the art are completely familiar, or a modem power supply such as that found in the Alpha Power+® Meter Modem manufactured by ABB Power T&D Company, Inc., Raleigh, N.C. Associated switches and discrete devices are not shown but are also within the knowledge of those skilled in the art. The power supply 55 is coupled to the meter power supply 70 from which it receives its power. A battery or battery pack 56 is also coupled to the modem power supply 55 to provide power to the modem 35 in the event of a meter power outage.

The modem is typically supplied from an unregulated 12 V output from the meter. In some meters, the 12 V output is provided from a switching regulator, while in other meters, the output is the rectified output of a linear step-down transformer. When line power to the meter 40 is lost, the modem 35 switches over to backup power from the battery pack 56 for the purpose of making a phone call to notify the utility company or customer of the power outage. The battery pack 56 can be located within the meter housing, as shown. The battery pack 56 preferably consists of series connected lithium thionyl chloride cells.

The modem microcontroller 50 monitors the battery voltage and warns of battery failure. The utility company or customer can be notified about battery status with data sent back via the telephone line. The modem microcontroller 50 controls the direction or path of serial data between itself, the modem IC 52, and the main meter microcontroller 65. Under normal operating conditions (with the meter 40 powered), the modem microcontroller 50 operates to connect the modem IC 52 to the meter microcontroller 65.

In this state, the modem microcontroller 50 monitors the communication between the meter microcontroller 65 and the modem IC 52. When the modem microcontroller 50 detects a power failure, it interrupts communication between the meter 40 and the modem IC 52 and instead opens data communication between the modem microcontroller 50 and the modem IC 52. A preferred microcontroller 50 is a PIC17C73 microcontroller manufactured by Microchip. An RC224ATF modem manufactured by Rockwell is also preferred.

Thus, the meter circuit has a switching means for operating a modem from the meter power supply as long as line voltage (line power) is present. When line power fails, a controller, preferably a microcontroller 50, in the modem 35 switches the modem 35 to battery power and begins the process of an outage reporting call to a remote central computer or an operator, for example, located at a utility company. The modem 35 waits a predetermined amount of time after the meter loses line power to avoid reporting momentary power outages, such as flicker or momentary sag. Moreover, the meter 40 preferably enters a power down power saving or sleep mode (e.g., keeps time only) to conserve power of its own battery (not shown) while waiting to place the outage reporting call.

After the predetermined waiting time, the modem 35 places the outage telephone call. The modem 35 checks to ensure that there is no other off-hook device on the telephone line. If no other device is off-hook, the modem 35 goes off-hook. A power outage call to a predetermined telephone number is then placed. The modem 35 makes the telephone connection with the remote computer 15, and waits for the computer 15 to answer and respond with communication commands.

The modem 35 waits a predetermined and programmable amount of time for the call receiving station (the remote computer 15 at the central station 10) to answer. If there is no answer, the modem 35 waits a programmable, predetermined time period and starts the reporting call sequence again. This sequence is repeated until the report call is successfully completed, or a predetermined maximum number of retries or attempts has occurred. Thus, the outage reporting sequence is repeated until one of the two following conditions occurs: (1) the modem 35 successfully reports the outage, or (2) the maximum number of retries has occurred.

If the first attempt at placing the outage call fails (e.g., off-hook condition of telephone line or busy signal encountered), the modem 35 is preferably placed in a low power mode during the wait time until another attempt is made to place the outage call. In the low power mode, preferably only the microcontroller 50 and the modem 52 are operational in a low power (sleep) mode for the duration of the wait to attempt a subsequent call. This reduces power consumption during the waiting time.

When the telephone call is completed and the modem 35 is in communications with the receiving station, the outage report is given to the receiving station 10 and the receiving station 10 then terminates the session; e.g., the remote central computer 15 sends a "terminate session" command when the call is complete. When the session is terminated or the attempt is aborted, the microcontroller 50 turns the battery source 56 off; i.e., the modem 35 turns off to conserve the power in the battery pack 56.

Preferably, if a call does not lose carrier, but there is no activity on the line for a predetermined period of time, the modem 35 terminates the call. This time-out value is preferably programmable.

The modem 35 uses off-hook and intrusion detection, as described, for example, in co-pending U.S. patent application "TELECOMMUNICATIONS OFF-HOOK AND INTRUSION DETECTION METHOD AND APPARATUS", Ser. No. 08/998,166, filed Dec. 24, 1997 (attorney docket ABME-0244), which is incorporated herein by reference, to assure that the telephone line is available throughout the call for the outage reporting call. A very low power circuit for checking that the telephone line is available is used. Moreover, low power CMOS integrated circuits are preferably used. However, it is contemplated that any conventional off-hook and intrusion detection circuit can be used in accordance with the present invention.

Off-hook detection recognizes that the telephone is in use when the modem 35 tries to make a call. Intrusion detection recognizes when another telephone extension is "picked up" while the modem 35 is in a communications session—the modem 35 will cease communications and give up the telephone line for use by the other party. These features address issues that arise when a modem-equipped meter is used on a shared telephone line with telephone subscriber phone sets on the same line.

If the modem 35 is waiting or attempting to place an outage reporting call, the modem controller 50 preferably keeps track of the duration of any momentary power restorations. If the duration of the power restoration is less than a predetermined period of time, the modem controller 50 continues to attempt to place the outage call. If the duration of the power restoration is greater than the predetermined period of time, the outage reporting call is canceled.

Figure 3A:
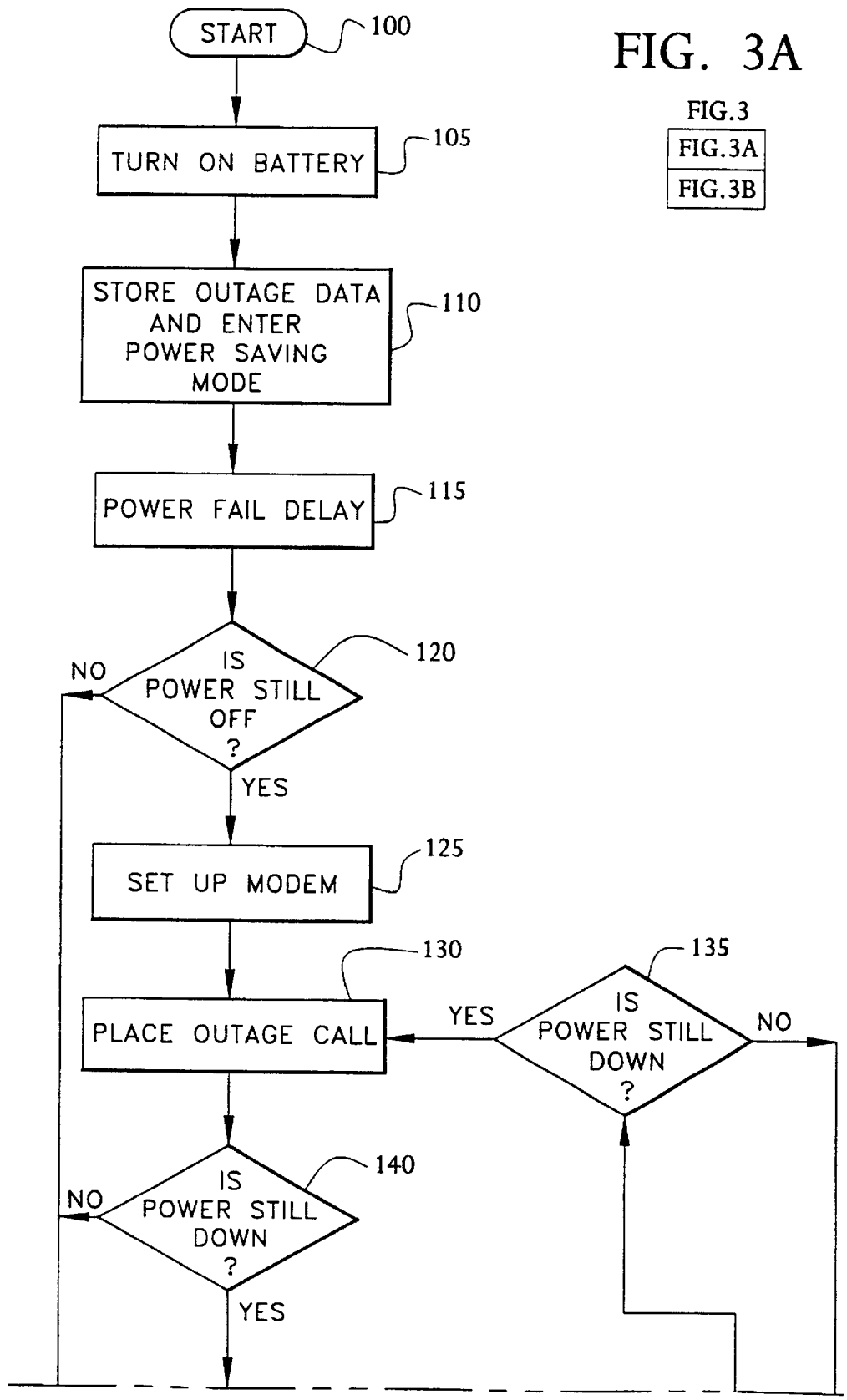
FIG. 3 is a flow chart of an exemplary power outage detection and reporting method in accordance with the present invention.
Figure 3B:
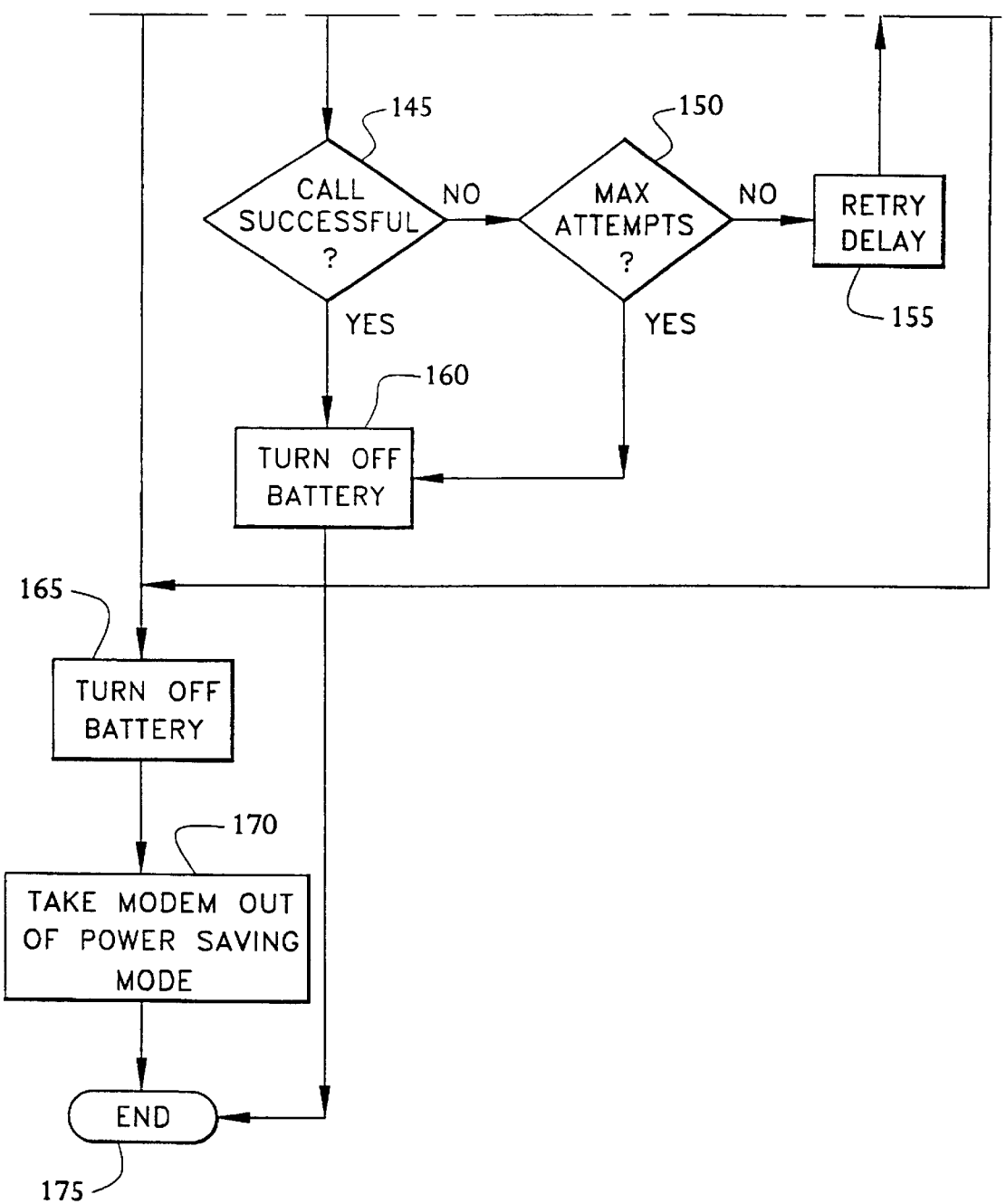
Figure 4A:
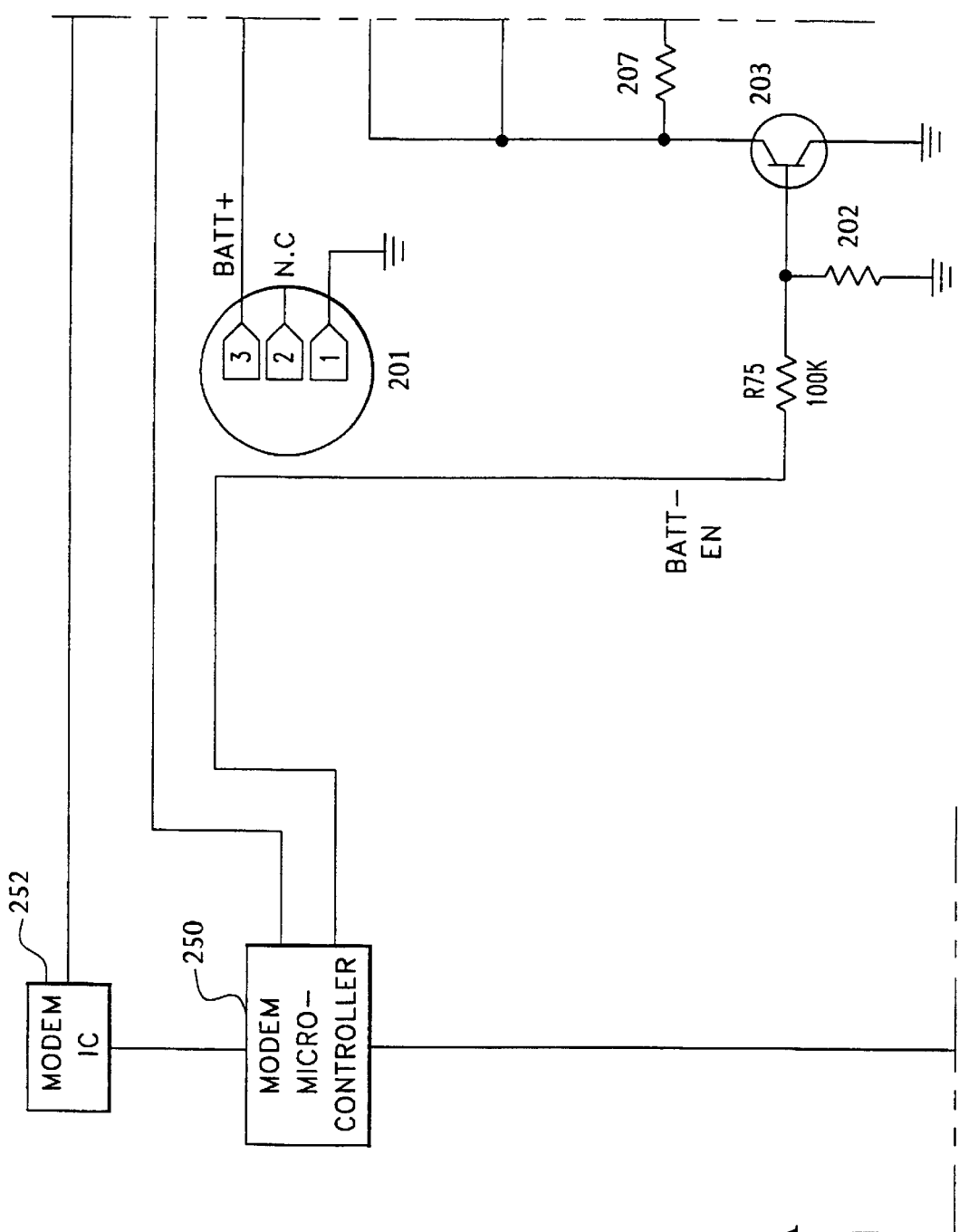
FIG. 4 is a schematic circuit diagram of an exemplary modem comprising power outage detection and reporting apparatus in accordance with the present invention.
Figure 4B:
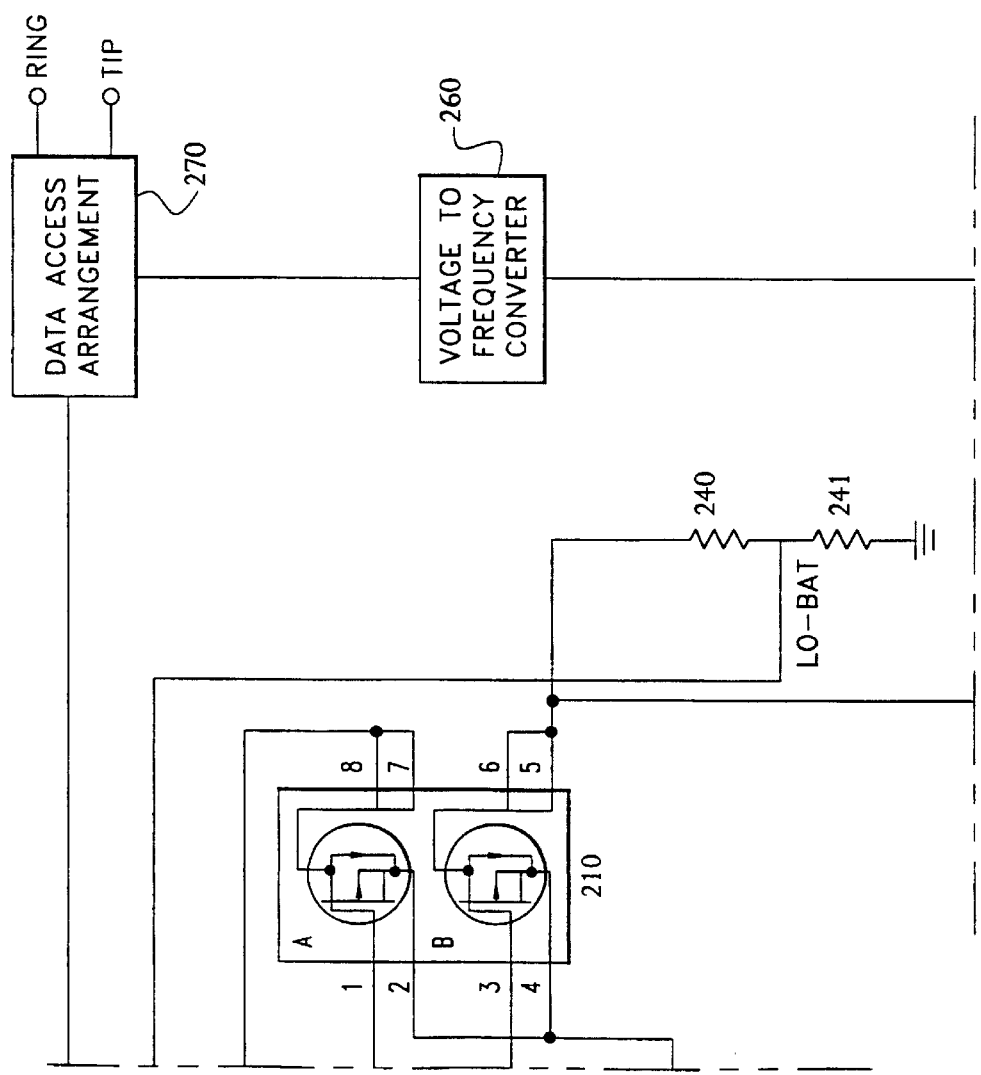
Figure 4C:
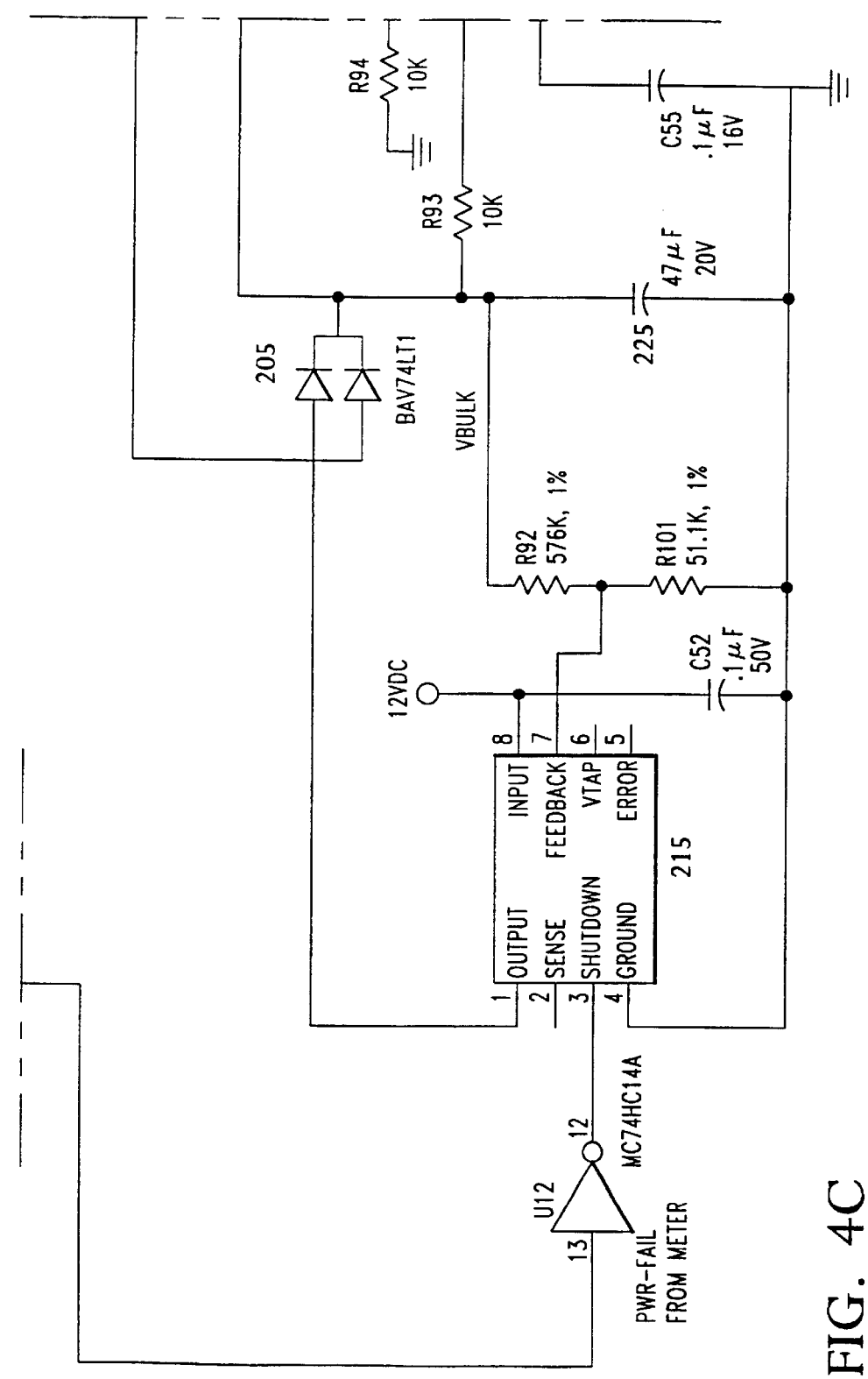
Figure 4D:
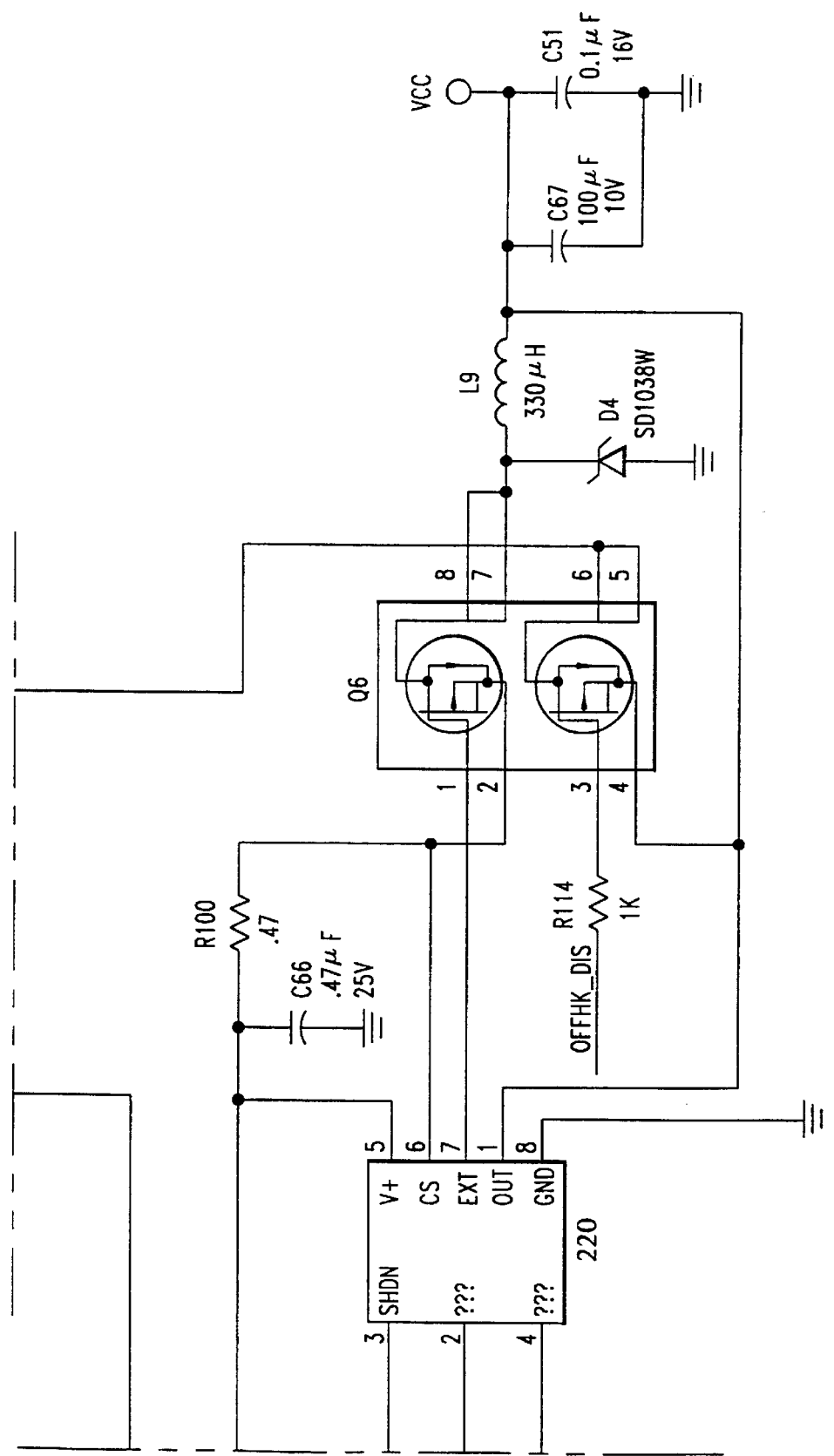

An exemplary method of detecting a power line outage, switching to battery power, and alerting a central computer or a utility provider about the power outage is shown in FIG. 3. At step 100, the line power fails, and the method in accordance with the present invention begins. If the modem is online, it hangs up. At step 105, a battery, such as the battery 56 of FIG. 2, is turned on. The outage data (e.g., location identification, date, and time of outage) is stored in a memory, at step 110. Also, preferably, when power is lost, the meter 40 goes into a power saving mode. The system waits a programmable, predetermined amount of time at step 115. A timer is started when the power goes out. The timer is used to determine if the power outage is an actual power line outage or merely a flicker or momentary sag. The length of the power outage required to initiate a report call is selectable by the user (e.g., selectable between about 0 and 255 seconds). The line power is checked at step 120. If the power has been restored (i.e., is not still off) within the predetermined amount of time, it is determined that a momentary power lapse, such as a flicker or sag, occurred, and not an outage that is to be reported as a line outage. Accordingly, the battery 56 is turned off at step 165, the modem is taken out of the power saving mode at step 170 and the outage processing exits at step 175. The modem 35 resumes normal operation at step 175. At this point, additional processing by the meter may occur, such as logging the flicker or sag in an appropriate log.

If the power is still off at step 120, then it is determined that an outage has occurred, and the modem 35 is reset or initialized at step 125, and an outage call is placed at step 130, to a programmable, predetermined telephone number.

After the outage call is placed, it is determined at step 140 if the power is still down. If not, then processing continues at step 165 with the battery 56 being turned off. If the power is still out after the outage call has been placed, then it is determined if the outage call from step 135 has been successful, at step 145. If the call was not successful, then it is determined if the maximum number of attempts (a programmable, predetermined number) has been made, at step 150. It should be noted that a counter is used to count the number of attempts that have been made to place the outage call. The counter is incremented each time an outage call is placed, and is reset after a successful outage call has been made. If the maximum number of attempts has not been reached, a retry delay is implemented at step 155, the modem 35 is placed in a power saving mode during this delay, and it is determined at step 135 if the power is still down. If the power is still down at step 135, then another outage call is placed with processing continuing at step 130. If the power has come back on and thus is not still down at step 135, then processing continues at step 165 with the battery 56 being turned off.

If the call was successful, at step 145, or if the maximum number of attempts has been reached, at step 150, the modem 35 is turned off at step 160 with all components powered down. This eliminates substantially all battery power draw during extended outages. When power is restored, the modem resumes normal operation at step 175.

The modem will resume normal operation when line power is restored. At this point, further processing can occur, such as the meter 40 and modem 35 alerting the receiving station 10 that line power has been restored.

Once the outage report is given to the receiving station 10, the receiving station 10 terminates the session and the modem 35 is turned off to conserve power in the battery pack 56. If a call does not lose carrier, but there is no activity on the line for a predetermined period of time, the modem 35 terminates the call.

Thus, the outage reporting sequence is repeated until one of the two following conditions occurs: (1) the modem 35 successfully reports the outage, or (2) the maximum number of retries has occurred.

Preferably, if the power comes back on while an outage call is being placed (i.e., the modem is off-hook), the modem controller 50 continues to try to place the outage call. If the power comes back on while an outage call is not being placed, the outage reporting call is canceled.

When power is restored (e.g., continuous power must be supplied for a programmable, predetermined period of time between about 0 and 255 seconds), the meter 40 reports the restoration. If an outage reporting call is in process (i.e., the modem 35 is off-hook) when the power is restored, the outage call completes before the restoration call is placed. If the outage call is in outage retry delay, the outage report call attempt is terminated by the modem controller 50 to allow the restoration reporting sequence.

If the modem 35 is being used (e.g. to download usage data from the meter to the central office) (i.e., off-hook) when the line power goes out, the data download call is aborted (the modem goes on-hook).

When an outage call is being placed, if an off-hook or intrusion is detected (e.g., the homeowner picks up his telephone to make a call), the outage call is aborted.

A schematic circuit diagram of a preferred embodiment of the apparatus in accordance with the present invention is shown in FIG. 4. The modem microcontroller 250 and the modem IC 252 are similar to the modem microcontroller 50 and the modem IC 52, respectively, described above with respect to FIG. 2. The exemplary modem further comprises a data access arrangement (DAA) 270 which is a conventional analog front end portion of a modem and is understood by those skilled in the art. The DAA 270 is connected to the TIP and RING terminals of the telephone line. A voltage to frequency converter 260 acts as an off-hook and intrusion detector by monitoring the TIP to RING voltage of the telephone line. The voltage to frequency converter is coupled to the TIP and RING terminals of the telephone line and converts the voltage across the terminals to a frequency which is then compared with certain thresholds or differences to determine the status of the telephone line.

As described above and as is understood by those skilled in the art, off-hook is the state of a telephone or data communications device during a call and while initiating a call; i.e., when the telephone or data communications device connects to a telephone line. Intrusion is defined as a second parallel connected telecommunications device going off-hook while a first device is already off-hook. Off-hook status and intrusion detection are accomplished by monitoring the voltage between the TIP and RING terminals on the telephone line.

In accordance with the present invention, it is determined whether the telephone line is available, i.e., on-hook, for use by the modem to communicate the power line outage data and also to determine whether the customer has picked up a telephone or other telecommunications device while the meter modem is using the telephone line to transmit the data to the central office. If an off-hook state is detected, the meter will not attempt to use the telephone line. If an off-hook state is not detected, the meter will use the telephone line, and the intrusion detector will continue to monitor the telephone line for another telecommunications device to go off-hook (i.e., an intrusion). As soon as an intrusion is detected, the detector releases the telephone line, so that the customer can use the telephone line.

When no devices on the line are off-hook, the voltage across the TIP and RING terminals is equal to the central office battery voltage, which in nominal conditions varies from about 42 V to about 56 V. Although these are nominal values, the actual values which may be encountered can be much greater or less than the nominal values due to factors such as telephone line loop resistance. While the present invention was designed to operate on voltages significantly greater than or less than the nominal values set forth above, the following explanation will assume that the nominal values are present.

When the meter modem, or any other parallel connected telecommunications device such as the customer's telephone, is off-hook, the voltage between TIP and RING becomes significantly lower because of the voltage or IR drop of the telephone line. When off-hook, a telecommunications device typically draws at least 20 mA. Because the telephone line loop resistance typically varies from about 400 Ω to 1700 Ω, the TIP to RING voltage decreases by at least 8.0 V (although this value can vary greatly) when a device goes off-hook (assuming no other parallel connected devices are already off-hook).

Although it is not possible under all combinations of central office battery voltage and loop resistance to determine with absolute certainty the off-hook status of other devices using a fixed voltage threshold, it is possible to determine off-hook status by dynamically adjusting the threshold.

If one device is off-hook and then another device goes off-hook (e.g., the meter modem is in use, and then the customer picks up the telephone), an intrusion occurs, and the nominal value between the TIP and RING terminal further drops. Intrusion detection can be accomplished by monitoring changes (differences) in the voltage of the telephone line during a modem call. If, for example, the modem is in the middle of a call, it will provide about a 380 Ω load between the TIP and RING terminals. Assuming the nominal 48 V central office voltage and 1100 Ω loop resistance, the loop current will be about 30 mA and the voltage between TIP and RING at the modem will be about 11.6 V. If a second parallel connected device also goes off-hook, the loop current increases to about 39 mA, assuming the load of the second device is 180 Ω. The voltage between TIP and RING is then decreased to about 4.8 V, as compared to the 11.6 V before the intrusion occurred. Even under worst case conditions, with a 1700 Ω loop resistance and 42 V central office battery voltage, the loop current will be about 20 mA when only the modem is off-hook. The TIP to RING voltage would then be about 7.7 V. If a second device goes off-hook, the loop current will increase to about 23 mA, so the TIP to RING voltage will decrease to about 2.8 V. Therefore, by monitoring the TIP to RING voltage during a call, the modem can detect an intrusion based on the voltage levels or changes (or frequency changes corresponding to the voltage changes) and release the line for use by the parallel connected device.

The battery is preferably a battery pack containing four 3.6 V cells connected in series. This arrangement results in a terminal voltage of 14.4 V. Because modem circuits typically require about 5 V for operation, a high efficiency (about 80–85%) switching supply (regulator 220) is used to step the voltage down to 5 V. The current drawn from the battery is less than that needed by the modem. The battery pack is located in the meter housing and preferably connects to the modem through a three position MTA style connector 201. Preferably, the battery has a small size and has a wide operating temperature range (e.g., −40° C. to +85° C.) so it can be used in outdoor metering applications. A preferred battery is a lithium thionyl chloride cell manufactured by Tadiran Batteries Ltd.

A set of programmable parameters are used to maximize the likelihood of completing a call in a timely manner while conserving battery power. One of these parameters is the minimum time for power to be off before placing an outage call (i.e., the initial wait time after power fails before starting the call-in sequence). The length of the power outage required to initiate a report call is programmable. If an outage duration exceeds this value, an outage call is scheduled. Another programmable parameter is the maximum time to wait for central office outage logging system to answer (i.e., the maximum length of time the modem remains off-hook in an attempt to complete an outage call. If the call is not successful within this length of time, the modem hangs up and schedules another call). Another programmable parameter is the maximum time to wait until trying again in the event of a failed outage call (i.e., a call retry delay), and another parameter is the number of times to attempt the call. The data is stored in a memory, preferably an EEPROM (electrically erasable programmable read-only memory) residing on the meter. This data is sent to a memory in the modem, preferably an EEPROM when power is applied to the meter and the modem is initialized. Another variable is the minimum time period between power outages required to trigger an outage call.

A series diode 205 (preferably a BAS20 device), and a pair of back-to-back P-channel MOSFETs (shown as elements 210 A and B) are used to protect the battery from reverse charging currents. This is a safety measure used to prevent the battery from venting if it were charged. A silicon diode is preferred, because the reverse charge current is preferably limited to not more than 5 ma which greatly reduces the danger of venting. Diode 205 provides primary protection against reverse charging, transistor 210A provides secondary protection. BATT_EN is normally held low by the microcontroller 250, thus, 210A will be off and will block reverse current flow. It should be noted that the body diode for 210A is in the direction of normal current flow when the modem is under battery power. Thus, 210A cannot be used to switch battery current on and off. This is why transistor 210B is also used. Transistor 210B is in the opposite direction as 210A to block current in the forward direction.

When meter power is lost or failing, the meter will pull PWR_FAIL low.

When this input goes low, the microcontroller 250 enables the battery by driving BATT_EN high. This turns on transistor 203, which switches 210A and 210B on. The resistor 207 pulls the gates of 210A and 210B up to their source voltage to keep them off until BATT_EN goes high. The resistor 202 ensures that transistor 203 stays off when the microcontroller 250 is being reset.

The modem microcontroller 250 controls the direction of data between itself, the modem IC 252, and the main meter microcontroller (element 65 in FIG. 2). Under normal operating conditions (with the meter powered), the modem microcontroller 250 connects the modem IC 252 to the meter microcontroller 65. In this state, the modem microcontroller 250 is able to monitor operation. When the modem microcontroller 250 detects a power failure, it interrupts communication between the meter and the modem IC 252 and opens data communication between the modem microcontroller 250 and the modem IC 252.

A low dropout voltage, low quiescent current linear regulator 215 is provided. Regulator 215 (preferably LP2951CM manufactured by National) is used as a preregulator to protect the switching regulator 220 from meter supply voltages which exceed the maximum rating of the switching regulator 220 (16.5 V).

The regulator 215 is normally on when the modem is operating under meter power. When line power to the meter is lost, the meter drives PWR_FAIL low. This drives the SHUTDOWN input to regulator 215 high, which turns off the linear regulator. Diode 205 prevents current from flowing into the OUTPUT pin of regulator 215 when the battery is enabled.

Capacitor 225 (preferably T495X476MO20AS manufactured by Kemet) acts both as a bulk input capacitor for the switching regulator 220, and as an output capacitor for the linear regulator 215. Capacitor 225 preferably stores sufficient energy to power the modem board at the switch-over from meter power to battery power. Assuming a drop in voltage of 3 V, capacitor 225 can hold up the modem for approximately 3 ms with a worst case load. The modem microcontroller 250 enables the battery in less than 3 ms after a power fail warning.

Resistors 240, 241 form a voltage divider which provides the microcontroller 250 with a fraction of the battery voltage. This is used to detect battery failure in case of low battery voltage.

Placing the battery inside the meter greatly simplifies the installation of the meter because there are no extra battery boxes or modem to mount, and thus no additional wiring between the extra battery boxes and the meter.

It should be noted that the components shown are exemplary only and that one skilled in the art would understand that equivalent components can be used for equivalent functionality. Not shown are the standard components of a modem, including telephone jack, modem coupling transformer, and transient voltage protection components.

The baud rate of communications between the modem and the central station is selectable. Preferably, the data sent during the outage call comprises the account identification, modem serial number, time of outage, modem status, and battery low flag.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. An energy meter comprising:
    a modem having a modem power supply and a modem microcontroller;
    a power supply for the energy meter coupled to said modem power supply;
    a battery coupled to said modem power supply; and
    a telecommunications interface coupled to said modem, wherein said modem microcontroller monitors said power supply for the energy meter and places an outage reporting call to a remote site via said telecommunications interface when said power supply for the energy meter is out, determines if said outage reporting call was successful, turns off said modem if said outage reporting call was successful, and places another outage reporting call to said remote site if said outage reporting call was not successful and until a number of attempted outage reporting calls exceeds a predetermined number after which said modem is turned off.

2. The energy meter according to claim 1, wherein said modem power supply is switched to said battery when said power supply for the energy meter is out.

3. The energy meter according to claim 1, wherein said modem microcontroller switches said modem power supply to said battery when said power supply for the energy meter is out.

4. The energy meter according to claim 1, wherein said outage reporting call reports outage data comprising an identification, a date, and a time when said power supply for the energy meter is out.

5. The energy meter according to claim 1, further comprising off-hook and intrusion detection means for determining the state of a telephone line during said outage reporting call.

6. The energy meter according to claim 1, further comprising a timer for timing a duration of a power outage.

7. An apparatus for reporting a power outage at an energy meter, powered by a power supply, to a remote site, comprising,
a modem having a modem power supply and a modem microcontroller;
a battery coupled to said modem power supply; and
a telecommunications interface coupled to said modem,
wherein said modem microcontroller monitors said power supply for the energy meter,
wherein said modem microcontroller places an outage reporting call to the remote site via said telecommunication interface after the power outage has lasted at least a predetermined duration of time, determines if said outage reporting call was successful, turns off said modem if outage reporting call was successful, and places another outage reporting call to said remote site if said outage reporting call was not successful and until a number of attempted outage reporting calls exceeds a predetermined number after which said modem is turned off.

8. The apparatus according to claim 7, wherein said modem is powered by said battery after the power outage at the energy meter occurs.

9. The apparatus according to claim 7, wherein said outage reporting call reports outage data comprising an identification, a date, and a time of the power outage.

10. The apparatus according to claim 7, further comprising a timer for timing a duration of the power outage.

11. The apparatus according to claim 7, further comprising off-hook and intrusion detection means for determining a state of a telephone line during said outage reporting call.

12. A method of transmitting data from an energy meter, powered by a power supply, indicative of a power outage, comprising the steps of:
monitoring said power supply for the energy meter with a modem having a microcontroller;
detecting the power outage;
powering the modem by a battery;
storing outage data;
placing an outage reporting call to a remote site;
determines if said outage reporting call was successful;
turning off said modem if outage reporting call was successful; and
placing another outage reporting call to said remote site if said outage reporting call was not successful and until a number of attempted outage reporting calls exceeds a predetermined number after which said modem is turned off.

13. A method of transmitting data from an energy meter indicative of a power outage, comprising the steps of:
detecting the power outage;
powering a modem by a battery;
storing outage data;
placing an outage reporting call to a remote site;
determining if said power outage is still occurring prior to placing said outage reporting call;
determining if said power outage is still occurring after placing said outage reporting call; and
turning off said modem if said power outage has ended one of prior to and after placing said outage reporting call.

14. The method according to claim 12, further comprising the step of waiting a predetermined time before placing said outage reporting call.

15. An energy meter comprising:
a modem having a modem power supply and a modem microcontroller;
a power supply for the energy meter coupled to said modem power supply;
a battery coupled to said modem power supply; and
a telecommunications interface coupled to said modem,
wherein said modem microcontroller monitors said power supply for the energy meter and places an outage reporting call via said telecommunications interface when said power supply for the energy meter is out, determines if said power outage is still occurring prior to placing said outage reporting call, determines if said power outage is still occurring after placing said outage reporting call, and turns off said modem if said power outage has ended one of prior to and after placing said outage reporting call.

16. An apparatus for reporting a power outage at an energy meter, powered by a power supply, to a remote site, comprising:
a modem having a modem power supply and a modem microcontroller;
a battery coupled to said modem power supply; and
a telecommunications interface coupled to said modem,
wherein said modem microcontroller monitors said power supply for the energy meter,
wherein said modem microcontroller places an outage reporting call to the remote site via said telecommunication interface after the power outage has lasted at least a predetermined duration of time, determines if said power outage is still occurring prior to placing said outage reporting call, determines if said power outage is still occurring after placing said outage reporting call, and turns off said modem if said power outage has ended one of prior to and after placing said outage reporting call.

* * * * *